(12) United States Patent  
Kaura

(10) Patent No.: US 6,478,956 B2  
(45) Date of Patent: Nov. 12, 2002

(54) MANUALLY PRESSURIZED WATER FILTERING CONTAINER

(76) Inventor: Kamaljit S. Kaura, 22991 La Cadena Dr., Laguna Hills, CA (US) 92653

( * ) Notice: Subject to any disclaimer, the term of this patent is extended or adjusted under 35 U.S.C. 154(b) by 33 days.

(21) Appl. No.: 09/798,464

(22) Filed: Feb. 27, 2001

(65) Prior Publication Data

US 2002/0117442 A1 Aug. 29, 2002

(51) Int. Cl.⁷ .............................................. B01D 35/26
(52) U.S. Cl. .................. 210/232; 210/244; 210/416.3; 210/445; 210/450; 210/474; 210/489
(58) Field of Search ................................ 210/232, 244, 210/416.3, 445, 450, 474, 489

(56) References Cited

U.S. PATENT DOCUMENTS

| | | | |
|---|---|---|---|
| 2,167,225 A | 7/1939 | Eweyk | |
| 2,761,833 A | 9/1956 | Ward | |
| 3,010,583 A | * 11/1961 | Kenyon | |
| 4,054,526 A | 10/1977 | Muller | |
| 4,441,996 A | 4/1984 | Hurst | |
| 4,477,347 A | 10/1984 | Sylva | |
| 4,492,313 A | 1/1985 | Touzani | |
| 4,529,511 A | 7/1985 | Breeden et al. | |
| 4,979,654 A | 12/1990 | Nohren, Jr. | |
| 4,990,254 A | 2/1991 | Toida et al. | |
| 5,310,085 A | 5/1994 | Lontrade et al. | |

* cited by examiner

Primary Examiner—Robert J. Popovics
(74) Attorney, Agent, or Firm—Gene Scott-Patent Law & Venture Group

(57) ABSTRACT

A manually pressurized water filtering container comprising an enclosure having a compressible wall terminating at an open neck and a removable, water permeable filter module and a cap adapted for receiving the filter module and for engaging and sealing the open neck. A sealing gasket is compressed between two sealing surfaces in one case by a retainer and in another case by the engagement of the cap on the container. Water forced out of the enclosure by compression of the wall moves through the filter module to reach the open neck and the cap.

6 Claims, 5 Drawing Sheets

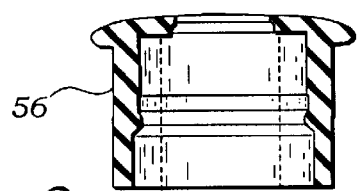
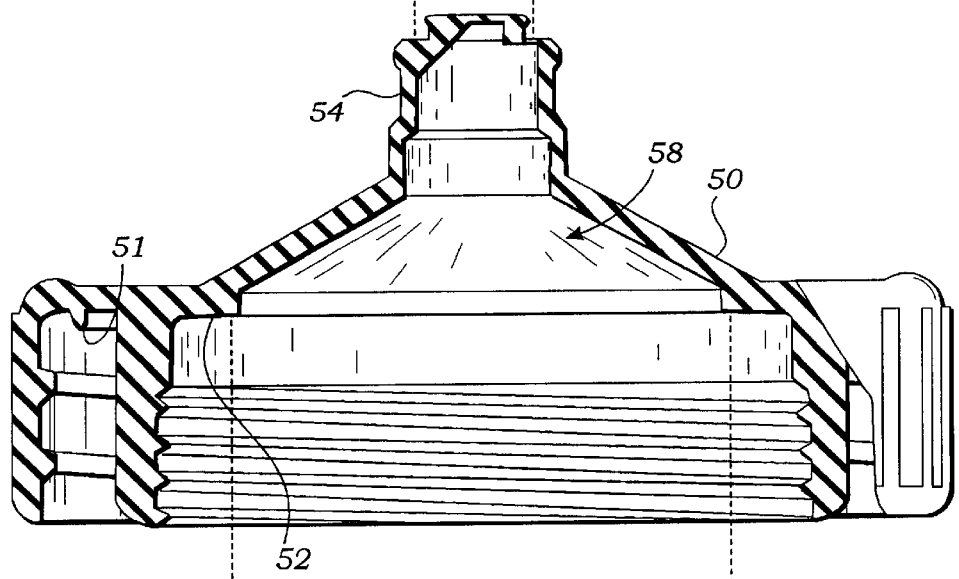
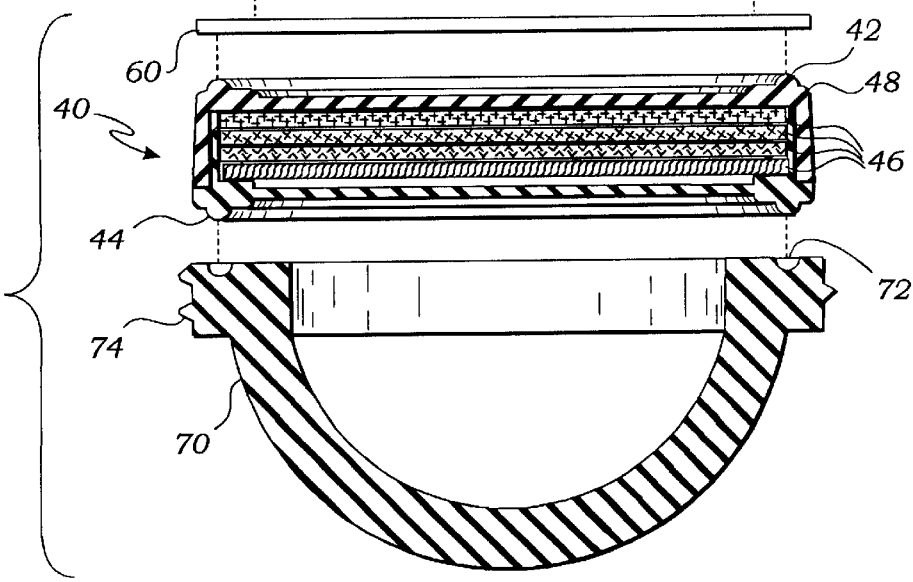

MANUALLY PRESSURIZED WATER FILTERING CONTAINER

BACKGROUND OF THE INVENTION

1. Field of the Invention

This invention relates generally to water filtering and devices for accomplishing the filtration of water for drinking, and more particularly to a portable container for holding a supply of unfiltered water and for forcing the water through a filter assembly by pressing upon the container manually so that filtered water is made available for drinking.

2. Description of Related Art

The following art defines the present state of this field:

Eweyk, U.S. Pat. No. 2,167,225 describes a water purifying apparatus, in combination, a lower receiving bottle having a threaded neck, an upper raw water discharging bottle both bottles being commercial bottles of ordinary construction, a water purifier body portion interposed between the two bottles and threaded on the neck of the lower bottle, the upper bottle being inverted and resting upon and extending partly within the upper portion of the body portion, the body portion having a vent opening for the upper bottle and a vent opening for the lower bottle and a sterilizing and purifying medium within the body portion and through which the raw water flows in passing from the upper to the lower bottle.

Ward, U.S. Pat. No. 2,761,833 describes a liquid treating apparatus comprising a bottle adapted to hold liquid therein, said bottle having flexible walls, the walls of said bottle being flexible when pressed and adapted by their inherent resiliency to return to their original position when pressure is released, an open neck in said bottle, a cartridge having an elongated shape, an inlet neck at one end of said cartridge and an outlet at the other end of said cartridge, said outlet being in the form of a nozzle and being substantially smaller than said inlet neck, said inlet neck being detachably connected to the open neck of said bottle whereby said cartridge extends externally of said bottle and makes a leak-tight seal therewith, and a mass of ion exchange resins in said cartridge, the squeezing of the flexible walls of said bottle causing the liquid therein to pass through and be treated by said mass of resins, and thereafter to emerge from said toilet.

Muller, U.S. Pat. No. 4,054,526, shows a bottle for treating water by passing water through a treatment cartridge in the top of the bottle, the cartridge containing for example activated charcoal to remove chlorine and/or cationic resin to soften the water. The water in the bottle is pressurized by means of a spring-urged slidably sealed piston or manually operated pump or the like, and a valve manually operable from the exterior of the bottle regulated the flow rate of the discharge of the water from the bottle.

Hurst, U.S. Pat. No. 4,441,996, is an apparatus for producing drinking water from bacteria contaminated cold water is provided. The cold contaminated water is placed into a flexible collector having a sub-micron porous filter in the bottom. When the flexible collector is squeezed, the pressure forces the contaminated water through the filter and into a holding chamber. The drinkable filtered water is removed from the holding chamber through a sterile exit opening.

Sylva, U.S. Pat. No. 4,477,347, shows a portable water purifier having a filter housing adapted to contain a replaceable filter assembly to which filter housing is releasably attached an unfiltered water chamber with a pressurizing pump located on the top thereof. A cup member is releasably attached to the unfiltered water chamber covering the pressurizing pump and a cap member is releasably attached beneath the filter housing when the portable water purifier is in its storage mode. When the portable water purifier is in its use mode, the cap is removed from the base of the filter housing and attached to the bottom of the cup and the cup is removed from its position covering the pressurizing pump and attached to the filter housing at the position where the cap was attached. Water to be filtered is placed in the unfiltered water chamber when it is disengaged from the filter housing and after reattachment thereto the pressurizing pump is manually operated to create pressure in the unfiltered water chamber forcing the unfiltered water through the filter and into the cup.

Breeden et al., U.S. Pat. No. 4,529,511 describes a water treatment container having a first chamber of variable volume and an second chamber for containing a water treating agent such as an ion exchange resin. Retainers are situated on the inlet and outlet of the second chamber to retain the water treating agent within the second chamber. Filters are positioned adjacent to retainers to filter the water. The first chamber is constructed so as to have a manually variable volume. Water added to the first chamber is caused to flow through the second chamber and out a dispensing outlet as the volume of the first chamber is reduced by application of a manually applied pressure.

Nohren, Jr., U.S. Pat. No. 4,979,654 describes a cap for use with water treatment apparatus specifically adapted to cooperate with an open neck of a bottle having an exterior projection formed on the neck thereof. The cap includes a lower component having a circumferentially continuous lower portion which has an interior projection adapted to cooperate with the exterior projection of the bottle, and surfaces for cooperatively engaging a tubular member mounted in the open neck of the bottle. The cap lower portion also includes a top portion having a central part and a peripheral part which has a plurality of circumferentially spaced through-extending openings, the openings disposed substantially 360 degrees around the circumference of the cap. The upper component of the cap is mounted for axially slidable movement relative to the lower component from a closed position wherein the upper component covers the openings, to an open position wherein the upper component is axially spaced from the lower component around the periphery thereof so that liquid may freely flow through the openings in the lower component top part, and then between the upper component and the lower component under the force of gravity.

Toida et al, U.S. Pat. No. 4,990,254, shows a portable water purifier comprising an outer elongated hollow body having openings formed at the upper and lower portions, a cup adapted to be inserted in the outer elongated hollow body from the lower opening thereof, a filtering elongated hollow body adapted to be inserted in a cup from the upper opening of the outer elongated hollow body, and a cap fitted detachably on the upper portion of the outer elongated hollow body to cover this upper opening. The cup and the filtering elongated hollow body are accommodated in the outer elongated hollow body when the portable water purifier is not used in a portable manner. When this portable water purifier is used, the cup is pulled out from the outer elongated hollow body and is set under the outer elongated hollow body, so that water is poured from the upper opening of the outer elongated hollow body and is filtered through a filter in the filtering elongated hollow body. The filtered water is stored in the cup.

Lontrade et al, U.S. Pat. No. 5,310,085, shows a liquid enclosed in a resiliently deformable container, the neck of which has a microfiltering membrane which is permeable to the liquid but impermeable to air when wet. Since the container resiliently recovers its shape after it is deformed, the liquid remaining in contact with the outside of the membrane after use is sucked back in and the membrane is kept moist until the next time the container is used.

The prior art teaches the use of portable water filtration devices and of the use of a bellows wall and a flexible wall, each capable of hand pressurizing a water volume to be filtered. However, the prior art does not teach that such a device can be made in the manner set forth in the present embodiment, and fails to teach a manner in which a filter may be mounted and sealed in such a mount while being available for quick and easy release for replacement. The present invention fulfills these needs and provides further related advantages as described in the following summary.

SUMMARY OF THE INVENTION

The present invention teaches certain benefits in construction and use which give rise to the objectives described below.

A manually pressurized water filtering container comprising an enclosure having a compressible wall terminating at an open neck and a removable, water permeable filter module and a cap adapted for receiving the filter module and for engaging and sealing the open neck. A sealing gasket is compressed between two sealing surfaces in one case by a retainer and in another case by the engagement of the cap on the container. Water forced out of the enclosure by compression of the wall moves through the filter module to reach the open neck and the cap.

A primary objective of the present invention is to provide a portable water filtering system having advantages not taught by the prior art.

Another objective is to provide such a system including a filter assembly made-up of a series of separate disks such that the requisite filter elements may be assembled to achieve the type of filtration necessary for each application.

A further objective is to provide such a system including a means for compression mounting the filter assembly to achieve a water tight seal.

A further objective is to provide such a system having a bellows section integral with the container's wall wherein the bellows sections have a variable thickness to provide for stepwise variable resistance to deformation.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a sectional view of a container cap thereof;

FIG. 3 is a sectional view of a container cap lid thereof;

FIG. 4 is an exploded sectional view of a seal ring, filter assembly and retainer thereof;

DETAILED DESCRIPTION OF THE PREFERRED EMBODIMENT

Figure 1:
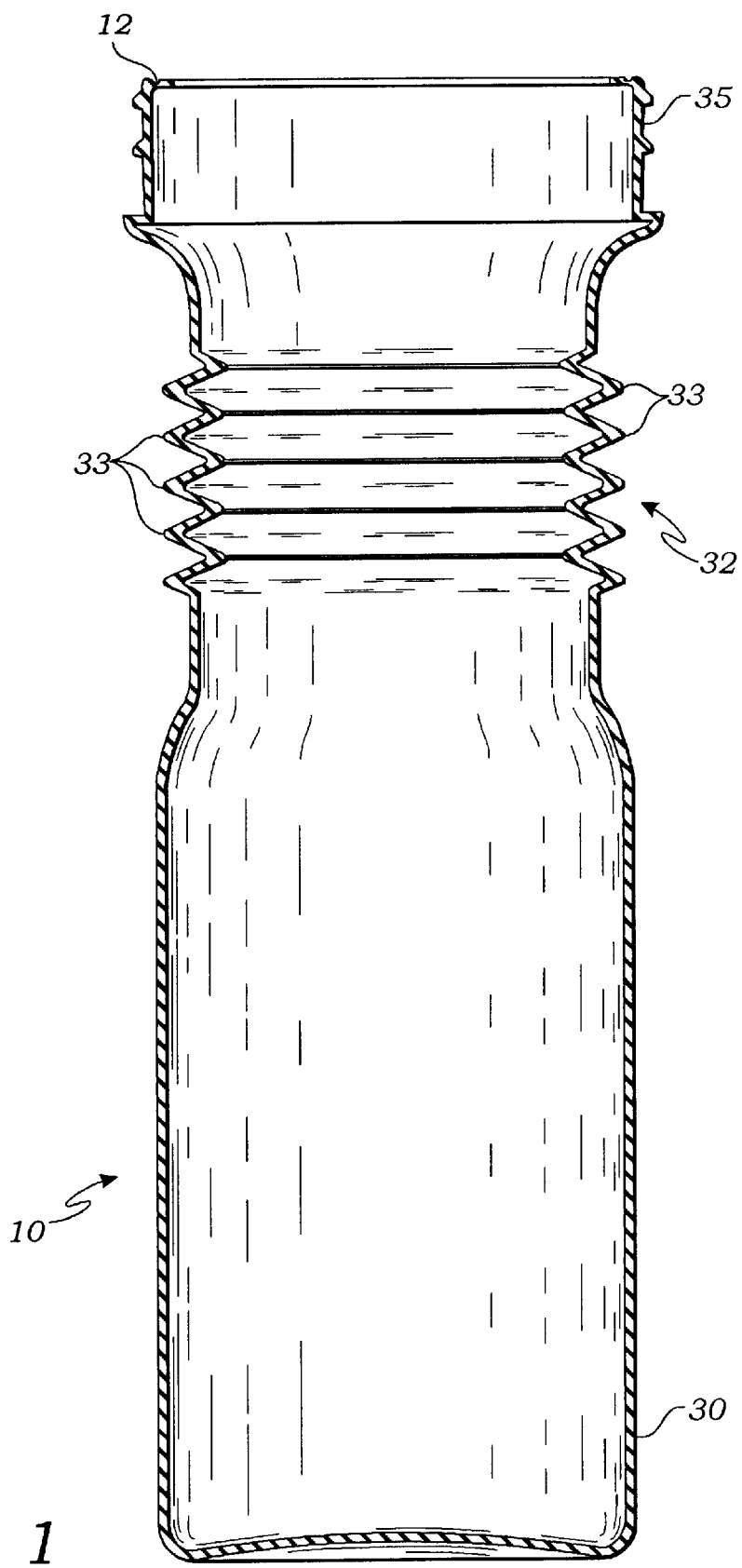
FIG. 1 is a sectional view of a container according to a first embodiment of the present invention.

The above described drawing figures illustrate the invention in two embodiments. In a first embodiment shown in FIGS. 1–5, a manually pressurized water filtering container comprises an enclosure 10 having a compressible wall 30 terminating at an open neck 35. A removable, water permeable filter module 40 is received within a cap 50 and together, they seal the open neck 35 using a rubber sealing gasket 60, compressed between a sealing surface 52 of the cap 50 and the filter module 40 by a retainer 70 so as to press an annular sealing bead 42 into the sealing gasket 60, and to engage an annular positioning rim 44 of the filter module 40, positioned in opposition to the sealing bead 42, within a corresponding annular dimple 72 of the retainer 70. The retainer 70, in this embodiment is threaded into the cap 50. See external threads 74 in FIG. 4. The sealing gasket 60, filter module 40, cap 50 and retainer 70 are aligned and positioned so that water forced out of the enclosure 20 by compression of the wall 30 moves through the filter module 40 to reach the open neck 35 and the cap 50 which has a spout 54 and a spout closure 56 of any type well known and in commercial use. See FIG. 3. The cap provides a conical chamber 58 adapted by use of a preferred chamber side wall angle of between about 50 and 70 angular degrees, relative to the axis of symmetry of the cap, for enabling an unbroken water flow from the spout 54. This range of angles has been found to be critical in providing such an unbroken water stream as it immerges from the spout 54. At angles greater than about 70 degrees water throughput is excessively dampened, and at angles less than about 50 degrees, the water stream has been found to easily become intermittent and unstable.

Figure 5:
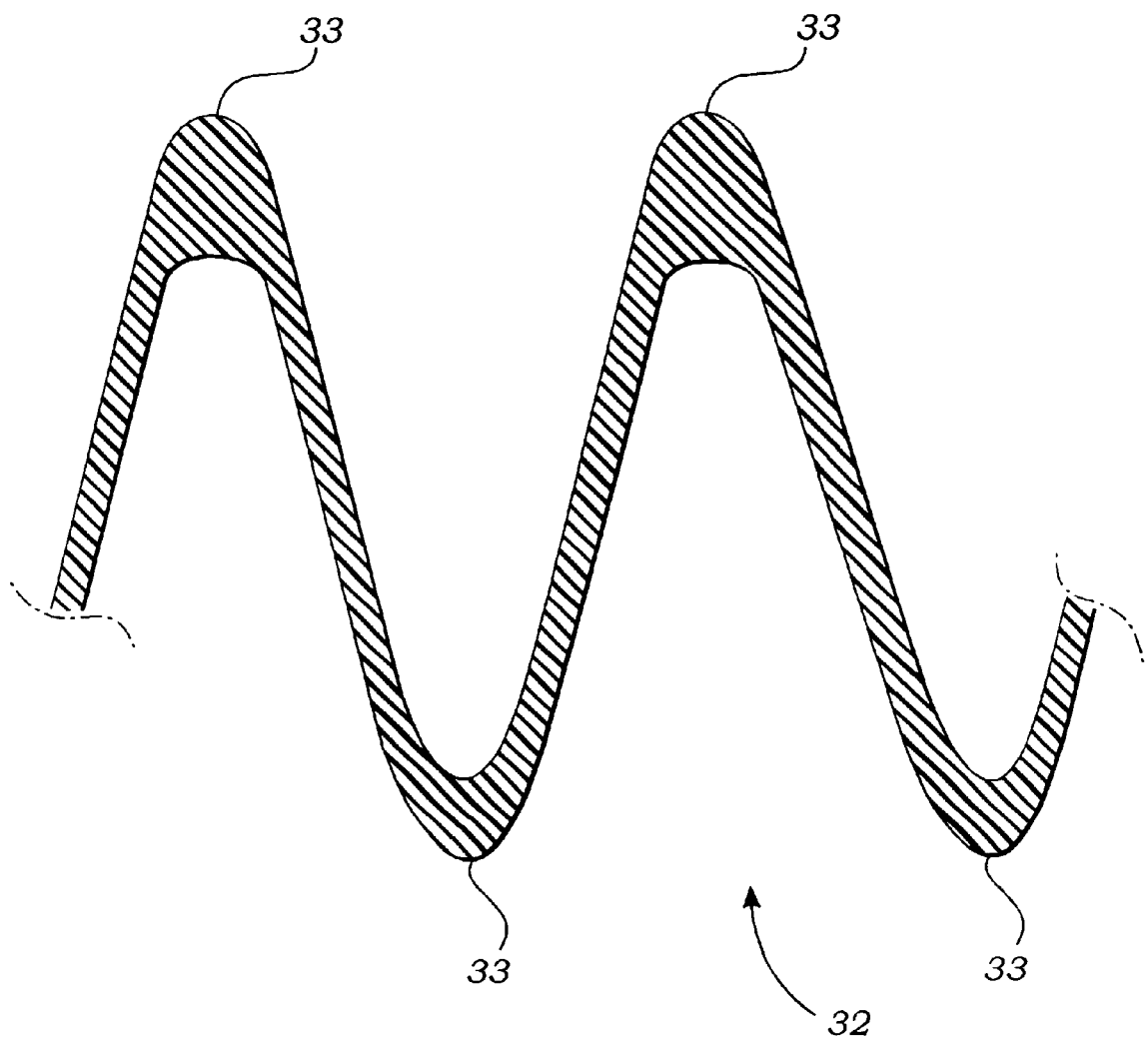
FIG. 5 is a sectional view of a portion of a bellows wall thereof.

In this embodiment, the compressible wall 30 has a bellows portion 32 providing a series of bellows folds 33, wherein each of the bellows folds 33 provides a variable wall thickness, as shown in FIG. 5. Each of the bellows folds 33 provides an inwardly directed portion 34 and an outwardly directed portion 36, where, the inwardly directed portion 34 has a superior wall thickness, and the outwardly directed portion has an inferior wall thickness as can be seen in FIG. 5. It has been discovered that this type of construction enables an extended life to the bellows portion 32 and provides compression with relatively less force during a first compressive effort wherein the outwardly directed portions 36 are the primary flexed portions, while providing further compression thereafter with a relatively greater force when the inwardly directed portions 34 are foced to flex.

Preferably, the open neck 35 of the enclosure 10 provides an inwardly directed terminal flange 12 and the cap 50 provides a corresponding annular rim 51 positioned for sealing engagement with the terminal flange 12 when the cap 50 is fully engaged with the enclosure 10 as by the screw threads shown, or in any other engagement manner that is able to draw the parts into close proximity.

Preferably, the filter module 40 includes a plurality of disk shaped filter elements 46 assembled in surface-to-surface contact as a filter stack and enclosed within a filter housing 48.

Figure 6:
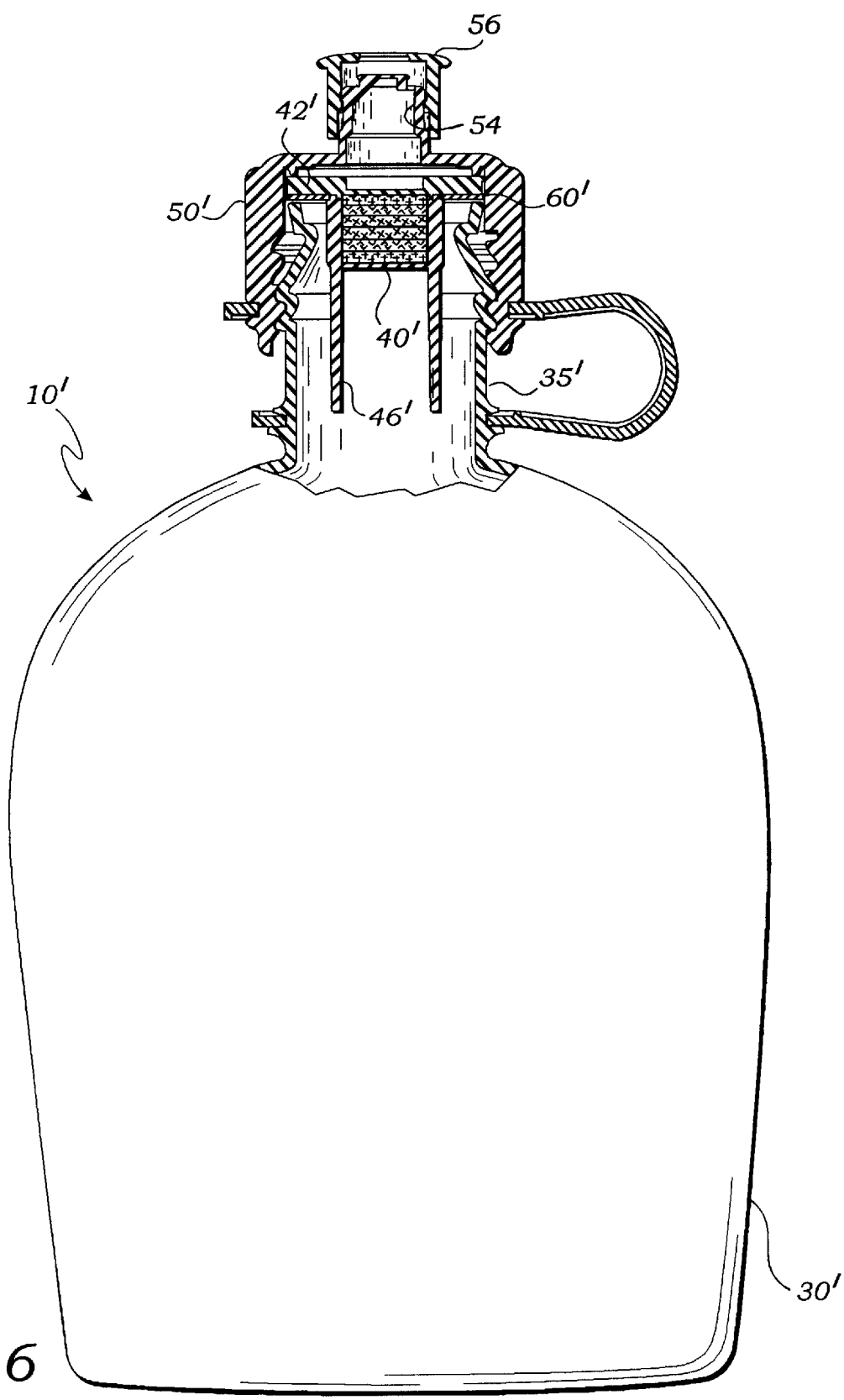
FIG. 6 is a sectional view of a container according to a second embodiment of the present invention.
Figure 7:
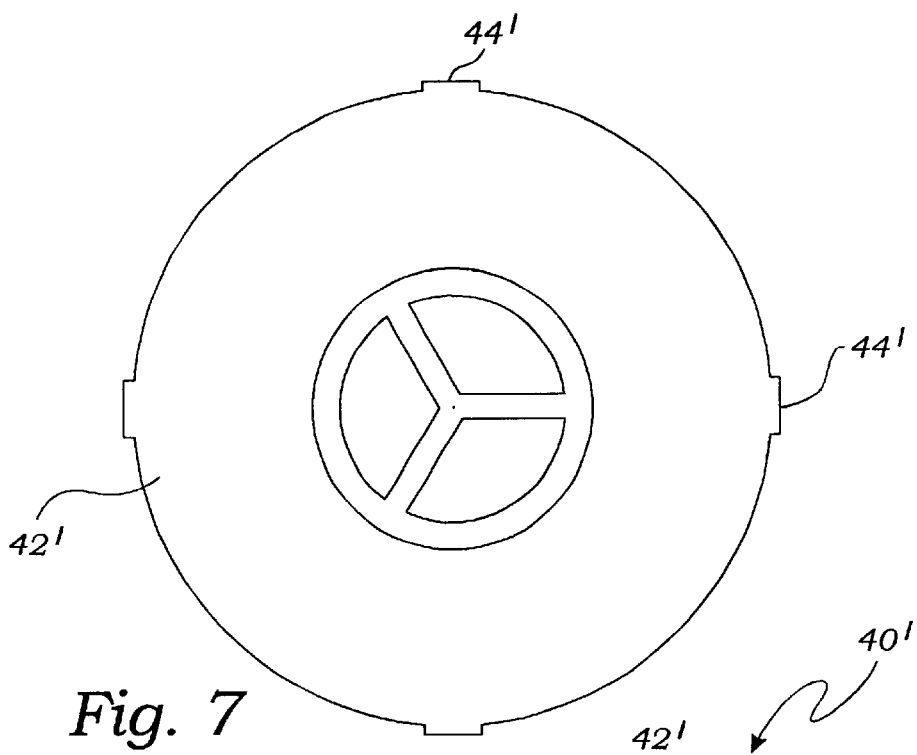
FIG. 7 is a plan view of a gasket thereof.
Figure 8:
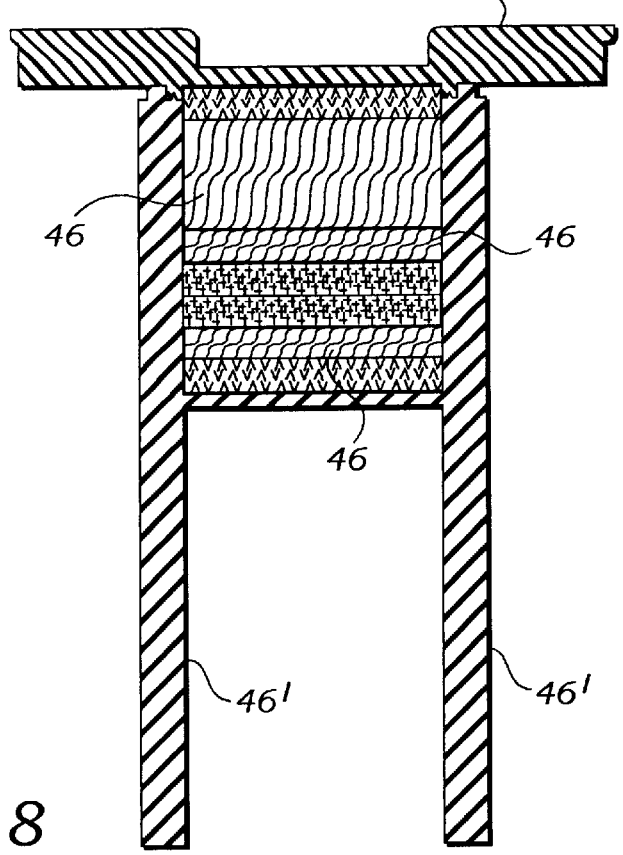
FIG. 8 is a sectional view of a filter module thereof.

In a further embodiment of the present invention shown in FIGS. 6–8, a manually pressurized water filtering container comprising an enclosure 10' having a compressible wall 30' terminating at an open neck 35'. A removable, water permeable filter module 40' and a cap 50' are adapted for engaging and sealing the open neck 35'. A sealing gasket 60' is compressed between a sealing surface 36' of the open neck 35' and the filter module 40' when the cap 50' is engaged with the open neck 35' of the enclosure 10'. The sealing gasket 60', filter module 40', and cap 50' are aligned and positioned so that water forced out of the enclosure 10' by compression of the wall 30' moves through the filter module 40' to reach the open neck 35' and the cap 50'.

In this embodiment, the compressible wall 30' comprises a highly flexible plastic material, that is able to be easily pressed by hand to create pressure within the enclosure 10'. The cap 50' provides an annular bead 51' positioned as shown in FIG. 6 for sealing engagement with the filter module 40' when the cap 50' is fully engaged with the enclosure 10'. An integral disk 42' of the filter module 40' includes a plurality of deformable tits 44' enabled by their size and position for deformed forced engagement when seating the filter module 40' within the cap 50'. Preferably, the filter module 40' includes a pair of integral elongated fingers 46' extending axially within the open neck 35' when the cap 50' is engaged with the open neck 35'.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A manually pressurized water filtering container apparatus comprising an enclosure having a compressible wall terminating at an open neck; a removable, water permeable filter module; and a cap adapted for threadedly receiving the filter module and for threadedly engaging and sealing the open neck; a sealing gasket, compressed between a sealing surface of the cap and the filter module by a retainer so as to press an annular sealing bead into the sealing gasket, and to engage an annular positioning rim of the filter module, positioned in opposition to the sealing bead, within a corresponding annular dimple of the retainer; the sealing gasket, filter module, cap and retainer aligned and positioned so that water forced out of the enclosure by compression of the wall moves through the filter module to reach the open neck and the cap.

2. The apparatus of claim 1 wherein the compressible wall comprises a bellows portion having a series of bellows folds, each of the bellows folds providing a variable wall thickness.

3. The apparatus of claim 2 wherein each of the bellows folds provides an inwardly directed portion and an outwardly directed portion, the inwardly directed portion having a superior wall thickness, the outwardly directed portion having an inferior wall thickness.

4. The apparatus of claim 1 wherein the open neck of the enclosure provides an inwardly directed terminal flange; the cap providing a corresponding annular rim positioned for sealing engagement with the terminal flange when the cap is fully engaged with the enclosure.

5. The apparatus of claim 1 wherein the filter module includes a plurality of disk shaped filter elements assembled in surface-to-surface contact as a filter stack and enclosed within a filter housing.

6. The apparatus of claim 1 wherein the cap provides a conical chamber adapted for enabling an unbroken water flow from the spout.

\* \* \* \* \*